United States Patent [19]

Ogawa et al.

[11] 4,417,018
[45] Nov. 22, 1983

[54] FLAME-RETARDANT RESIN COMPOSITION

[75] Inventors: Yoshinari Ogawa; Noriyuki Akagi, both of Sagamihara; Kenji Ikeda, Tokyo; Yoichi Nakamura, Hino, all of Japan

[73] Assignee: Teijin Limited, Tokyo, Japan

[21] Appl. No.: 378,231

[22] Filed: May 14, 1982

[30] Foreign Application Priority Data

May 25, 1981 [JP] Japan .................................. 56-78014
Mar. 15, 1982 [JP] Japan .................................. 57-39364

[51] Int. Cl.³ .............................................. C08K 5/54
[52] U.S. Cl. .................................... 524/261; 524/264; 524/410; 524/411; 524/412
[58] Field of Search ............... 524/262, 263, 264, 265, 524/410, 411, 412, 261; 525/413, 415

[56] References Cited

U.S. PATENT DOCUMENTS 3,475,371 10/1969 Stewart et al. ..................... 524/261
3,767,627 10/1973 Schoen ............................... 525/415
3,806,495 4/1974 Schoen ............................... 525/415
4,100,075 7/1978 Ashman et al. ..................... 524/262

FOREIGN PATENT DOCUMENTS 56-050958 5/1981 Japan .

OTHER PUBLICATIONS

Edwin P. Plueddemann, "Silane Coupling Agents", Additives for Plastics, State of the Art, vol. 1, Raymond B. Seymour, editor, pp. 123-167, 1978, Academic Press, N.Y.

*Primary Examiner*—Veronica P. Hoke
*Attorney, Agent, or Firm*—Burgess, Ryan & Wayne

[57] ABSTRACT

A flame-retardant resin composition comprising (A) at least one polymer resin selected from the group consisting of thermoplastic polyesters and thermoplastic polycarbonates and, per 100 parts by weight of the polymer resin, (B) 0.1 to 30 parts by weight, as the weight of the halogen element, of an organic halogen compound, and (C) 0.1 to 20 parts by weight, as the weight of the antimony element, of antimony trioxide treated with an alkoxysilane compound. The composition may further comprise up to 30 parts by weight of an organic acid ester compoundf and/or up to 200 parts by weight of a filler, per 100 parts by weight of the polymer resin.

10 Claims, No Drawings

FLAME-RETARDANT RESIN COMPOSITION

The present invention relates to a flame-retardant resin composition. More particularly, the present invention relates to a flame-retardant resin composition having excellent thermal stability.

Thermoplastic polyesters such as polyethylene terephthalate and polybutylene terephthalate, as well as thermoplastic polycarbonates, have been extensively used in the production of various articles owing to their excellent chemical and physical properties. The properties of these thermoplastic resins have been improved by the addition of various fillers such as fibrous reinforcing materials, e.g. glass fiber and carbon fiber, and inorganic fillers, as well as function-imparting agents such as flame-retardants and the like, and hence are being widely used.

Thus, it has been known to use a combination of an organic halogen compound and antimony trioxide as a flame-retardant for various thermoplastic resins. When this combination is used, a remarkable flame-retardant property is imparted to the thermoplastic resins to enhance their practicability. However, if antimony trioxide is blended into a thermoplastic polyester, the thermoplastic polyester is degraded so that the molecular weight is lower when it is heated to a molten state. Therefore, a thermoplastic polyester containing an organic halogen compound and antimony trioxide is inferior in thermal stability in respect to melt molding, and the shaped articles obtained therefrom have poor physical properties, especially poor mechanical strength.

Likewise, when a thermoplastic polycarbonate or a mixture of a thermoplastic polyester and a thermoplastic polycarbonate contains antimony trioxide, the thermal stability of the resin composition becomes very poor, and the shaped articles obtained from such a resin composition containing an organic halogen compound and antimony trioxide have poor mechanical strength and, in addition, poor appearance due to the occurrence of silver streaking or foaming.

The inventors made an extensive study in an attempt to eliminate the above-mentioned drawbacks, and it surprisingly was found that if antimony trioxide treated with an alkoxysilane compound is employed as a flame-retardant in combination with an organic halogen compound, the above-mentioned drawbacks of the thermoplastic resin compositions based on polyesters and/or polycarbonates can effectively be eliminated and thermoplastic resin compositions having an excellent flame retardance, as well as an excellent thermal stability and mechanical strength, can be obtained.

Thus, the present invention provides a flame-retardant resin composition comprising (A) at least one polymer resin selected from the group consisting of thermoplastic polyesters and thermoplastic polycarbonates and, per 100 parts by weight of the polymer resin, (B) 0.1 to 30 parts by weight, as the weight of the halogen element, of an organic halogen compound, and (C) 0.1 to 20 parts by weight, as the weight of the antimony element, of antimony trioxide treated with an alkoxysilane compound.

The thermoplastic polyester usable as component (A) in the composition of the present invention includes, representatively, a linear saturated polyester obtained by using terephthalic acid or an ester-forming derivative thereof, an acid component and a glycol with 2 to 10 carbon atoms or an ester-forming derivative thereof as a glycol component. Examples include polyethylene terephthalate, polypropylene terephthalate, polytetramethylene terephthalate (polybutylene terephthalate), polyhexamethylene terephthalate, polycyclohexane-1,4-dimethylol terephthalate, polyneopentyl terephthalate, and the like. Among them, polyethylene terephthalate and polybutylene terephthalate are particularly preferred.

These thermoplastic polyesters may be used alone or as a mixture of two or more thereof.

Other polyesters may also be used, such as those in which part of the terephthalic acid component is substituted by another copolymeric component or part of the glycol component with 2 to 10 carbon atoms is substituted by another copolymeric component. Examples of the copolymeric component include other aromatic dicarboxylic acids such as isophthalic acid and phthalic acid; halogen-substituted phthalic acids such as tetrabromophthalic acid and tetrabromoterephthalic acid; alkyl-substituted phthalic acids such as methylterephthalic acid and methylisophthalic acid; naphthalenedicarboxylic acids such as 2,6-naphthalenedicarboxylic acid, 2,7-naphthalenedicarboxylic acid, and 1,5-naphthalenedicarboxylic acid; diphenyldicarboxylic acids such as 4,4'-diphenyldicarboxylic acid and 3,4'-diphenyldicarboxylic acid; 4,4'-diphenoxyethanedicarboxylic acid and the like; aliphatic or alicyclic dicarboxylic acids such as succinic acid, adipic acid, sebacic acid, azelaic acid, decamethylenedicarboxylic acid, cyclohexanedicarboxylic acid, and the like. Examples of the copolymeric glycol component include aliphatic diols such as ethylene glycol trimethylene glycol, tetramethylene glycol, hexamethylene glycol, neopentyl glycol, diethylene glycol, and 1,4-cyclohexane dimethanol; dihydroxy benzenes such as hydroquinone, resorcinol, and the like; bisphenols such as 2,2-bis(4-hydroxyphenyl) propane, bis(4-hydroxyphenyl) sulfone, and the like; aromatic diols such as ether diol obtained from bisphenols and glycol such as ethylene glycol; polyoxyalkylene glycols such as polyoxyethylene glycol, polyoxypropylene glycol, polyoxytetramethylene glycol, and the like; and hydroxycarboxylic acids such as ε-oxycaproic acid, hydroxybenzoic acid, and hydroxyethoxybenzoic acid. These copolymeric components may be used singularly or in combination, and their ratio may be smaller than 20 mol% of the total dicarboxylic acid (hydroxycarboxylic acid is so regarded that half of the amount consists of carboxylic acid), and particularly be smaller than 10 mol%.

These thermoplastic polyesters may further be copolymerized with a trifunctional acid such as tricarballylic acid, trimelissic acid or trimellitic acid or with a tetrafunctional ester-forming acid and/or with a trifunctional or tetrafunctional ester-forming alcohol such as glycerine, trimethylol propane or pentaerythritol, as a branch component, in an amount of less than 1.0 mol%, preferably in an amount of less than 0.5 mol%, and more preferably in an amount of less than 0.3 mol%.

The thermoplastic polyesters employed here and, particularly, the polyethylene terephthalates have an intrinsic viscosity greater than 0.35, preferably greater than 0.45 and more preferably greater than 0.50 as measured in an orthochlorophenol solvent at 35° C.

The thermoplastic polyesters can be prepared by means of a conventional manufacturing process, such as melt-polymerization, or by means of a combination of melt-polymerization and solid-phase polymerization.

The thermoplastic polycarbonate usable for the present invention includes polycarbonates having recurring units represented by the general formula,

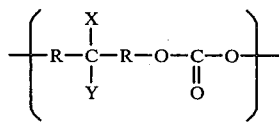

in which R represents phenylene, halo-substituted phenylene or alkyl-substituted phenylene and X and Y each represent hydrogen, a hydrocarbon radical or a hydrocarbon radical forming, together with an adjacent carbon atom, a cycloalkane radical, with the proviso that the sum of the carbon atoms contained in the X and Y groups is up to 12.

Preferred thermoplastic polycarbonates are 4,4'-dihydroxydiarylalkane polycarbonates and include, for example, polycarbonates obtained from a 4,4'-dihydroxydiphenylalkane, such as bis(4-hydroxyphenyl) methane, bis(4-hydroxyphenyl)ethane, 2,2-bis(4-hydroxyphenyl)propane, bis(4-hydroxy-3,5-dichlorophenyl)methane, 2,2-bis(4-hydroxy-3,5-dimethylphenyl)propane or bis(4-hydroxyphenyl)phenylmethane, and phosgene or diphenyl carbonate. The polycarbonates preferably have an average molecular weight of 20,000 to 40,000.

The organic halogen compound used as the component (B) in the present invention contains chlorine atoms or bromine atoms in the molecules and works as a flame-retarding agent for the thermoplastic polyesters or polycarbonates. The component (B) includes conventional organic halogen compounds that are usually used as flame-retardant.

Examples of such compounds may be low molecular weight organic halogen compounds, such as hexabromobenzene, hexachlorobenzene, pentabromotoluene, pentachlorotoluene, pentabromophenol, pentachlorophenol, hexabromobiphenyl, decarbromobiphenyl, tetrabromobutane, hexabromocyclododecane, perchloropentacyclodecane, decabromodiphenylether, octabromodiphenylether, hexabromodiphenylether, ethylene-bis-(tetrabromophthalimide), tetrachlorobisphenol A and tetrabromobisphenol A, halogenated polymers or oligomers such as halogenated polycarbonates (e.g., polycarbonate oligomers prepared using brominated bisphenol A as a starting material), halogenated epoxy compounds (such as diepoxy compounds prepared by the reaction of brominated bisphenol A with epichlorohydrin or a monoepoxy compound obtained by the reaction of a brominated phenol with epichlorohydrin), chlorinated polystyrene, brominated polystyrene, poly(dibromophenylene oxide), Dechlorane Plus ® (Hooker Chemical Co., condensation compound of 2 moles of tetrachlorocyclopentadiene and 1 mole of cyclooctadiene), and mixtures thereof.

These organic halogen compounds are added in an amount of 0.1 to 30 parts by weight, preferably in an amount of 1 to 15 parts by weight, reckoned as the halogen element, per 100 parts by weight of the polymer resin. When the amount added is smaller than 0.1 part by weight, the flame-retarding property is not sufficiently exhibited. When the amount added is greater than 30 parts by weight, on the other hand, the composition loses its physical properties to a considerable degree.

Antimony trioxide treated with an alkoxysilane compound, which is used as the component (C) in the present invention, exhibits a function as a flame-retardant agent which assists the flame-retarding property of an organic halogen compound which is used as the component (B). Antimony trioxide may be a naturally existing senarmontite or valentinite or may be obtained by boiling antimony oxychloride, which is obtained by hydrolyzing antimony chloride in a solution of sodium carbonate. Antimony trioxide is usually used together with an organic halogen compound to impart a flame-retarding property to the resins. When the thermoplastic polyester is used as a resin and when antimony trioxide is used, being blended with the organic ester compound, however, the molecular weight of the thermoplastic polyester is greatly reduced when it is melted, and the mechanical strength of the molded article is greatly deteriorated.

However, when antimony trioxide, which is treated with an alkoxysilane of the general formula,

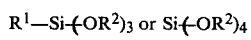

wherein $R^1$ denotes a hydrocarbon group (may be inclusive of a vinyl group, glycidyl group and/or amino group) with 1 to 25 carbon atoms and $R^2$ denotes a hydrocarbon group with 1 to 15 carbon atoms, is used as a flame-retarding assistant, the molecular weight of the thermoplastic polyester can be prevented from decreasing. As the hydrocarbon group of $R^2$, an aliphatic or aromatic hydrocarbon group is particularly preferred. Further, even when the thermoplastic polyester is molded at high temperatures, it is possible to obtain molded articles which maintain great mechanical strength.

Preferred examples of the alkoxysilane include methyltrimethoxysilane, methyltriethoxysilane, methyltriisopropoxysilane, methyltributoxysilane, methyl-sec-octyloxysilane, methyltriphenoxysilane, phenyltrimethoxysilane, phenyltriethoxysilane, vinyltriethoxysilane, vinyltributoxysilane, tetra-2-ethylhexyl silicate, tetranonyl silicate, tetratridecyl silicate, γ-glycidoxypropyltrimethoxysilane, and β-(3,4-epoxycyclohexyl) ethyltrimethoxysilane, and the like.

To treat antimony trioxide with an alkoxysilane, the antimony trioxide is usually brought into contact with an alkoxysilane (of an amount of 0.05 to 5% by weight with respect to the weight of the antimony trioxide) in the presence of water, followed by drying. For instance, antimony trioxide is introduced into a V-type blender, and an aqueous solution containing 0.1 to 2% of alkoxysilane is sprayed thereonto together with air or an $N_2$ gas while stirring the antimony trioxide, followed by drying; or antimony trioxide is dispersed in water or in an organic solvent to form a slurry, and an aqueous solution and/or an organic solvent solution of alkoxysilane is added thereto with stirring, and stirring then is discontinued so that the antimony trioxide is separated by precipitation, and then drying is effected; or an aqueous solution and/or an organic solvent solution of alkoxysilane discharged from a heating furnace is sprayed onto the antimony trioxide at a high temperature. The treatment of antimony trioxide, however, need not be limited to the above methods only. The reason is not yet clear why the resistance to, the heat of the thermoplastic polyester is prevented from deteriorating when use is made of antimony trioxide which is treated with alkoxysilane. However, from the fact that the alkoxy group in the alkoxysilane forms a silanol group upon reaction with water suspended in the air or with water added during the treatment step and the fact that siloxane is formed through dehydration and condensation, it is presumed that the surface of the antimony trioxide is coated with a film of polysiloxane, and the catalytic function of the antimony trioxide in respect to an ester-interchange reaction or hydrolysis reaction is inactivated.

Antimony trioxide treated with alkoxysilane should be added in an amount of 0.1 to 20 parts by weight, preferably in an amount of 1 to 15 parts by weight, reckoned as the antimony element, per 100 parts by weight of the polymer resin. When the amount added is smaller than 0.1 part by weight, its effect as a flame-retarding assistant is not sufficiently exhibited and when the amount added is greater than 20 parts by weight, the flame-retarding effect is not correspondingly increased. In this case, furthermore, the resin composition may lose its inherent characteristics.

An organic acid ester compound may preferably be added to the resin composition of the present invention, especially those wherein the polymer resin mainly contains a thermoplastic polyester, i.e. the polymer resin is comprised of a thermoplastic polyester and 0 to 100 parts by weight, per 100 parts by weight of the thermoplastic polyester, of a thermoplastic polycarbonate. The purpose of adding an organic acid ester compound may differ depending upon the class of the organic acid ester compounds. For instance, it may be added to enhance the flowability when the thermoplastic polymer resin is being molded or it may be added as a releasing agent. Also, it may be added as a plasticizer for imparting ductility or it may be added as a crystallization promoting agent to attain great effects.

Usable organic acid ester compounds include ester compounds formed by the condensation reaction of organic carboxylic acids with alcohols or oxycarboxylic acids. In general, the organic acid ester compounds may be those which are used as additives in the thermoplastic polyesters. The organic acid ester compounds, however, are not necessarily limited thereto.

Examples of organic acid ester compounds may include montan wax esters or salts of montan wax esters which are added as releasing agents, crystallization promoting agents, or plasticizers, as disclosed in Japanese Patent Publication Nos. 47-13137 (corresponding to German Offenlegungschrift Nos. 1,769,224, 1,794,114, 1,814,148 and 1,814,149) and 55-18453; neutral or partly neutralized ester salts of a saturated tertiary monocarboxylic acid mixture disclosed in Japanese Patent Publication No. 47-27780 (corresponding to German Offenlegungschrift No. 1,954,588); esters or polyesters formed by the reaction of an organic acid compound having 8 to 25 carbon atoms with alcohols having 1 to 10 carbon atoms, as disclosed in Japanese Patent Publication No. 47-48894 (corresponding to U.S. Patent Application Ser. No. 725,205 now U.S. Pat. No. 4,126,295); phthalic esters having molecular weights of from 200 to 20,000, as disclosed in Japanese Patent Application Laid-Open No. 53-101046 (corresponding to German Offenlegungschrift No. 2,706,128); oligomeric polyesters having molecular weights of from 900 to 5000, as disclosed in Japanese Patent Application Laid-Open No. 55-116751 (corresponding to U.S. Patent Application Ser. No. 14,404); esters of alcohols and aromatic or aliphatic carboxylic acids disclosed in Japanese Patent Applications Laid-Open Nos. 54-158452 (corresponding to U.S. Patent Application Ser. Nos. 882,219 now abandoned and 631 now U.S. Pat. No. 4,186,012) and 54-139654 (corresponding to U.S. Patent Application Ser. Nos. 882,219 and 9295 now abandoned); oligoesters of the type of phthalic acid disclosed in Japanese Patent Application Laid-Open No. 55-157647; polyester oligomers and polyether esters disclosed in Japanese Patent Applications Laid-Open Nos. 55-116751 (corresponding to U.S. Patent Application Ser. No. 14,404) and 55-127459 (corresponding to U.S. Patent Application Ser. No. 14,405 now U.S. Pat. No. 4,212,791); and organic carboxylic acid esters disclosed in Japanese Patent Application Laid-Open No. 55-52342.

In addition to the above-mentioned organic carboxylic acid ester compounds, a terminal-blocked polycaprolactone can also be used. The terminal-blocked polycaprolactone referred to here represents a polycaprolactone, [hereinafter simply referred to as terminal-blocked polycaprolactone,] which has a number average molecular weight smaller than 20,000 and in which at least 50% of all of the terminal groups are blocked. The thermoplastic polyester blended with a suitable amount of the terminal-blocked polycaprolactone exhibits an improved flowability when it is being molded and a greatly improved toughness, such as a greater stretchability and flexibility.

The terminal-blocked polycaprolactone can be prepared by reacting a polycaprolactone which has free carboxyl groups and/or hydroxyl groups at the terminals and which is obtained by the ring-opening polymerization of an $\epsilon$-caprolactone in a customary manner with a monovalent compound which reacts with the carboxyl groups or the hydroxyl groups.

Examples of the polymerization initiator used for the ring-opening polymerization of $\epsilon$-caprolactone include monovalent alcohols such as n-hexyl alcohol, n-heptyl alcohol, n-octyl alcohol, n-nonyl alcohol, lauryl alcohol, and myristyl alcohol; glycols such as ethylene glycol, propylene glycol, ethylethylene glycol, 2-methyl-1,2-propane diol, pinacol, $\beta$-butylene glycol, diethylene glycol, tetramethylene glycol, neopentyl glycol, and 1,4-cyclohexane dimethanol; trivalent alcohols such as glycerin, 1,2,3-butanetriol, 1,2,3-pentanetriol, and the like; tetravalent alcohols such as erythritol, pentaerythritol, and the like; monovalent carboxylic acids such as benzoic acid, p-methylbenzoic acid, lauric acid, and myristic acid; divalent carboxylic acids such as isophthalic acid, phthalic acid, terephthalic acid, 2,6-naphthalenedicarboxylic acid, 4,4'-diphenoxyethanedicarboxylic acid, succinic acid, adipic acid, sebacic acid, azelaic acid, decamethylenedicarboxylic acid, and cyclohexanedicarboxylic acid; trivalent carboxylic acids such as tricarballylic acid, trimelissic acid and trimellitic acid; tetravalent carboxylic acids such as pyromellitic acid and the like; and oxycarboxylic acids such as $\epsilon$-oxycarboxylic acid and hydroxyethoxybenzoic acid. Here, it is recommended to use a tin-type catalyst such as tetraoctyltin or diphenyltin dilaurate or a titanate-type catalyst such as tetrabutyl titanate in order to promote the ring-opening polymerization of $\epsilon$-caprolactone using the polymerization initiators.

The type of terminal groups of the thus obtained polycaprolactone is determined depending upon the polymerization initiator. When alcohols are used, the terminal groups will be hydroxyl groups. When carboxylic acids are used, the terminal groups will be carboxyl groups. When oxycarboxylic acids and water are used, the terminal groups will be hydroxyl groups and carboxyl groups. It is, however, preferred to use glycols as polymerization initiators.

In the polycaprolactones, at least 50% of all of the terminal groups, preferably at least 70% or more, must be blocked. Ideally, all of the terminal groups of the polycaprolactones are blocked. Any monovalent compound can be used to block the terminal groups provided the compound is capable of inactivating terminal carboxyl groups or terminal hydroxyl groups of the polycaprolactones. Blocking can be effected by, for example, ester bonding, ether bonding, urethane bonding or amide bonding. Preferably, however, blocking is effected by ester bonding. When the terminal groups are hydroxyl groups, the compound used for effecting blocking by ester bonding can be monovalent carboxylic acids or ester-forming derivatives thereof. When the terminal groups are carboxyl groups, the compound for blocking the terminal groups can be monovalent alcohols or ester-forming derivatives thereof. Examples of the monovalent carboxylic acids or ester-forming derivatives thereof include carboxylic acids such as acetic acid, propionic acid, butyric acid, valeric acid, caproic acid, heptanoic acid, caprylic acid, lauric acid, myristic acid, benzoic acid, toluic acid, dimethylbenzoic acid, ethylbenzoic acid, cumic acid, and 2,3,4,5-tetramethylbenzoic acid, as well as acid anhydrides thereof and acid halides thereof, and may further include ester derivatives of carboxylic acids thereof such as phenyl acetate, ethyl caproate, methyl benzoate, and ethyl toluylate. Examples of monovalent alcohols or ester-forming derivatives thereof include alcohols such as methyl alcohol, ethyl alcohol, n-propyl alcohol, isopropyl alcohol, isobutyl alcohol, n-amyl alcohol and lauryl alcohol, as well as halocarbonic esters thereof and carboxylic esters thereof.

The terminals of the polycaprolactones can be blocked by reacting them with monovalent alcohols or ester-forming derivatives thereof or by reacting them with monovalent carboxylic acids or ester-forming derivatives thereof in accordance with the conventional esterification reaction without any difficulty.

Particularly preferred terminal-blocked polycaprolactones are represented by the general formula,

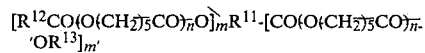

wherein $R^{11}$ denotes an organic group having the value $(m+m')$, $R^{12}$ and $R^{13}$ each denotes a monovalent organic group, respectively, n and n' are each a number greater than 2, and m and m' are each a number of from 0 to 4, $(m+m')$ being greater than 1.

In the above general formula, if $R^{11}$ is a glycol component group, then m' is 0, m is 2, and $R^{12}CO-$ represents a residue of monovalent carboxylic acid used for blocking of the terminals. If $R^{11}$ is a dicarboxylic acid component group, then m is 0, m' is 2, and $-OR^{13}$ denotes a residue of monohydric alcohol used for blocking of the terminals. If $R^{11}$ is a oxycarboxylic acid component group then m and m' are each 1, $R^{12}CO-$ denotes a residue of monovalent carboxylic acid used for blocking of the terminals, and $-OR^{13}$ denotes a residue of monohydric alcohol used for blocking of the terminals.

By blending a thermoplastic polyester with the thus obtained terminal-blocked polycaprolactone, the flowability during molding and the toughness or tenacity can be remarkably enhanced. The production of these effects is greatly dependent on the molecular weight of the terminal-blocked polycaprolactone. When the number average molecular weight is greater than 20,000, these effects are not exhibited or are exhibited very little. Particularly, tenacity is not increased at all. The effects, however, are remarkably improved when the thermoplastic polyester is blended with a terminal-blocked polycaprolactone having a number average molecular weight smaller than 20,000. When the terminal-blocked polycaprolactone is to be used in the present invention, therefore, the number average molecular weight should be smaller than 20,000, preferably smaller than 10,000, more preferably smaller than 5,000, and still more preferably smaller than 2,000.

The amount of the organic acid ester compound may vary broadly depending upon the purpose of the addition of or the kind of organic ester compound and cannot be difinitely specified. When added as a releasing agent, as a plasticizer, or as a crystallization promoting agent, however, the organic acid ester compound is usually added in an amount of at least 0.1 part by weight per 100 parts by weight of the thermoplastic polymer resin. When the amount added is smaller than 0.1 part by weight, only very slight effects are exhibited, and therefore the addition of the organic acid ester compound is insignificant. The upper limit of the amount added should be 30 parts by weight because even when organic acid ester compound is added in amounts in excess of the above limit, the effects are not increased accordingly or, rather, the thermoplastic polyester loses its inherent properties, such as resistance to heat, resistance to chemicals, and mechanical strength. In particular, when the terminal-blocked polycaprolactone is used as the organic ester compound, it should be blended in an amount of 0.1 to 30 parts by weight, preferably in an amount of 1 to 15 parts by weight per 100 parts by weight of the polymer resin.

The flame-retardant resin composition of the present invention may further contain up to 200 parts by weight of a filler per 100 parts by weight of the polymer resin. Examples of the filler includes fibrous materials such as glass fiber, asbestos, carbon fiber, aromatic polyamide fiber, potassium titanate fiber, steel fiber and ceramics fiber, and powdery, granular or plate-like inorganic fillers such as asbestos, mica, silica, talc, calcium carbonate, glass beads, glass flakes, clay and wollastonite.

These fillers are usually blended as reinforcing agents, surface-improving agents, or to improve electric properties, thermal properties or any other properties. Among these fillers, when a glass fiber is used, various advantages are exhibited, such as increased mechanical strength, increased resistance to heat, and reduced shrinkage during molding.

There is no particular limitation for the glass fiber provided it is of the type that is usually used for reinforcing the resin. For instance, the glass fiber may be selected from long fiber-type (glass roving) or short fiber-type such as chopped strands and milled fibers. The glass fiber may further be treated with a binder (such as polyvinyl acetate, polyester, or the like), a coupling agent (such as a silane compound, borane compound, or the like), or with any other surface-treating agent. The glass fiber may further be coated with such resins as thermoplastic resins, thermosetting resins, and the like. Glass fiber having long-fiber strands is usually used, being cut to a desired length before or after it is blended with the resin. This mode of use is also effective for the present invention.

Any blending method can be employed for obtaining the flame-retardant resin composition of the present invention. Usually, the components to be blended are uniformly dispersed. That is, all or part of the components are simultaneously or separately mixed and homogenized using a mixer such as a blender, kneader, roll or extruder. Or, part of the mixed components is simultaneously or separately mixed using a blender, kneader, roll or extruder, and the remaining part is then mixed and homogenized using the mixer or the extruder.

The most general method consists of melting and homogeneously kneading a composition which has been dry-blended beforehand in an extruder, extruding the composition in the form of wires, and cutting the wires to desired lengths to prepare granules. The thus prepared granular composition is sufficiently dried, thrown into a hopper of a molding machine maintaining the dry state, and is used for molding articles. Another method consists of adding and mixing other components before, after or during polymerization when the thermoplastic polymer is being prepared.

In particular, when a glass fiber is to be used as a filler, it may be dry-blended instead of being melted and kneaded in the extruder together with other components in order to prevent the glass fiber from being pulverized and to enhance the operation efficiency in the manufacture of the composition. For instance, the composition may be thrown into the hopper of a molding machine together with polyester resin granules, with a predetermined amount of glass chopped strands, or together with a thermoplastic resin containing large amounts of glass fibers.

To improve other properties, furthermore, the flame-retardant resin composition of the present invention can be blended with a variety of additives. For instance, the flame-retardant resin composition of the present invention may be admixed with inorganic substances that serve as nucleating agents, such as carbonates of alkaline earth metals (for example, calcium carbonate, magnesium carbonate, etc.), sulfates thereof (for example, potassium sulfate), metal oxides such as titanium oxide, aluminum oxide, and zinc oxide, as well as talc, graphite, aluminum silicate, clay, metal salts of organic acid (for example, stearate, benzoate, salicylate, tartarate, montanate, terephthalate, etc.), glycolates of alkaline earth metals or glycolates of such metals as titanium, germanium, antimony, tungsten and manganese, ionic copolymers consisting of α-olefins and α,β-unsaturated carboxylates, and ionomers such as a partial sodium salt of an ethylene/methacrylic acid copolymer, in such amounts that they will exhibit their effects.

In addition to organic halogen compounds, it is also allowable to add phosphorus compounds such as red phosphorus and amide phosphonate which serve as flame-retardant.

In order to improve the resistance to heat an antioxidizing agent such as a hindered phenol compound or sulfur compound or a thermally stabilizing agent such as a phosphorus compound may be added to the composition. Phosphorus compounds added for the above purpose have the following general formula (i) and (ii), $$X^1-\underset{\underset{O}{\|}}{\underset{|}{P}}-Z \qquad (i)$$
$$\phantom{X^1-P-Z}Y^1$$

-continued $$X^1-\underset{|}{\overset{Y^1}{P}}-Z \qquad (ii)$$

where $X^1$, $Y^1$ and Z each denotes a hydrogen atom, a group —$OR^3$ (where $R^3$ is a hydrogen atom or a monovalent hydrocarbon group) or a monovalent hydrocarbon group.

The monovalent hydrocarbon group in the above formulae may be an alkyl aralkyl or aryl group with less than 12 carbon atoms or the like. Examples of the alkyl group include methyl, ethyl, propyl, isopropyl, butyl, pentyl, hexyl, cyclohexyl, octyl and decyl. Examples of the aryl group include phenyl, naphthyl, methylphenyl, phenylphenyl, and brominated phenyl. The aralkyl group may be benzyl. Concrete examples of the phosphorus compounds include phosphoric esters such as phosphoric acid, trimethyl phosphate, methyldiethyl phosphate, triethyl phosphate, triisopropyl phosphate, tributyl phosphate, and triphenyl phosphate; phosphorous esters such as phosphorous acid, trimethyl phosphite, triethyl phosphite, and triphenyl phosphite; phosphonic acids and derivatives thereof such as phosphonic acid, phenylphosphonic acid, and phenyl phenylphosphonate; and phosphinic acids and derivatives thereof such as phosphinic acid, phenylphosphinic acid, and dimethylphosphinic acid. Among them, particularly preferred examples are such phosphoric and phosphorous esters as trimethyl phosphate and triphenyl phosphite. These phosphorus compounds can be used singularly or in combination.

Further, a variety of epoxy compounds may be added in order to improve the stability of the melt viscosity and the resistance to hydrolysis. Examples of the epoxy compound include epoxy compounds of the bisphenol A type obtained by reacting bisphenol A with epichlorohydrin, aliphatic glycidyl ethers obtained by reacting various glycols or glycerols with epichlorohydrin, epoxy compounds of the novolak type obtained from a novolak resin and epichlorohydrin, and epoxy compounds of the type of alicyclic compound obtained from alicyclic compounds. Particularly preferred examples of the epoxy compounds are epoxy compounds of bisphenol A type, diglycidyl ethers of a low molecular weight polyethylene glycol, diglycidyl esters of an aromatic dicarboxylic acid, and the like.

Further additives may include ultraviolet ray absorbing agents, coloring agents, lubricants, antistatic agents, foaming agents, and the like.

Further, there may be added other thermoplastic resins such as styrene resin, acrylic resin, polyethylene, polypropylene, fluorine-containing resin, polyamide resin, polysulfone, and the like; thermosetting resins such as phenol resin, melamine resin, unsaturated polyester resin, silicone resin, and the like; and soft thermoplastic resins such as ethylene/vinyl acetate copolymer, polyester elastomer, and the like.

The flame-retardant resin composition of the present invention can be easily formed in a conventional manner using a molding machine which is used for treating general thermoplastic resins.

The invention will be described below in detail with reference to working examples. In all of the examples, the intrinsic viscosity of the thermoplastic polyesters was measured in an ortho-chlorophenol solution at a temperature of 35° C. Further, the parts were all by weight.

In the examples, the properties were measured in accordance with the methods mentioned below.

(1) Static strength:
Tensile test—in compliance with ASTM D-638
Impact strength—in compliance with ASTM D-256 (⅛ in. (about 3.18 mm) thick without notch)

(2) Flammability:
Tested in compliance with the Specification, Subject 94 (UL-94), of Underwriter's Laboratories, U.S.A. Test pieces 5 in. (127 mm) long, ½ in. (12.7 mm) wide and 1/16 in. (about 1.59 mm) thick were prepared by means of the injection-molding method.

Reference Example A (preparation of antimony trioxide A treated with alkoxysilane):

100 parts by weight of water and 2 parts by weight of 1 N hydrochloric acid were added to 100 parts by weight of antimony trioxide, and 4 parts by weight of an acetone solution containing 25% of methyltriethoxysilane (trade name: MTS-32, manufactured by Daihachi Kagaku Kogyosho Co.) was dropwisely added thereto while being stirred so that the parts were homogeneously mixed. The mixture was then transferred to a vessel made of stainless steel and was dried in a dryer at 120° C.

Reference Example B (preparation of antimony trioxide B treated with alkoxysilane):

1 part by weight of phenyltrimethoxysilane (trade name: PTS-31, manufactured by Daihachi Kagaku Kogyosho Co.) was dissolved in 4 parts by weight of a t-butanol/diacetone alcohol mixture solution (50/50%). The solution was then added, while being constantly stirred, to 100 parts by weight of water, to which 2 parts by weight of 1 N hydrochloric acid had been added. 50 parts by weight of the resulting aqueous solution was uniformly sprayed onto the surface of 100 parts by weight of antimony trioxide and was then dried in a dryer at 130° C.

Reference Example C (preparation of antimony trioxide C treated with alkoxysilane):

100 parts by weight of antimony trioxide introduced into a ribbon mixer was treated in the same manner as in Reference Example A by using 2 parts by weight of a mixture solution consisting of 100 parts by weight of tetraethyl silicate (trade name: SI-42, manufactured by Daihachi Kagaku Kogyosho Co.), 30 parts by weight of water, 15 parts by weight of acetic acid, and 55 parts by weight of ethyl alcohol.

Reference Example D (preparation of antimony trioxide D treated with alkoxysilane):

Antimony trioxide was treated in the same manner as that of Reference Example A by using vinyltriethoxysilane (trade name: VT8-E, manufactured by Chisso Co.).

Reference Example E (preparation of antimony trioxide E treated with alkoxysilane):

Antimony trioxide was treated in the same manner as that of Reference Example A by using γ-glycidoxypropyltrimethoxysilane (trade name: MPS-M, manufactured by Chisso Co.).

EXAMPLES 1 THROUGH 5 AND COMPARATIVE EXAMPLES 1 THROUGH 5

A polyethylene terephthalate having an intrinsic viscosity of 0.71 was dried at 130° C. for 5 hours, was admixed with a glass chopped strand (trade name: 3PE 231, manufactured by Nitto Boseki Co.) having a length of 3 mm, talc as a nucleating agent, decabromodiphenyl ether (Planelone DB-100, by Mitsui Toatsu Co.) as a flame-retardant and the above-mentioned antimony trioxides in the proportions shown in Table 1, and the mixture was homogeneously mixed using a V-type blender. The obtained mixture was melted and mixed in a monoaxial extruder having a diameter of 65 mm and a vent at a barrel temperature of 270° C., and the threads extruded from the die were cooled and cut to obtain pellets for forming molded articles.

The pellets were then dried in hot air heated at 130° C. for 5 hours and were introduced into a 5-ounce injection-molding machine equipped with a test piece mold for measuring physical properties, under the molding conditions of a cylinder temperature of 260° C., a mold temperature of 70° C., an injection pressure of 800 kg/cm², a cooling time of 20 seconds, and a total cycle of 35 seconds.

The properties of the thus obtained molded articles are shown in Table 1.

TABLE 1

| Example No. | Composition (Parts) | | | | | Properties of Molded Articles | | | |
|---|---|---|---|---|---|---|---|---|---|
| | Polyethylene Terephthalate | Glass Fiber | Sodium Stearate | Decabromodiphenyl Ether | Antimony Trioxide | Intrinsic Viscosity | Tensile Strength (kg/cm²) | Flexural Strength (kg/cm²) | Flammability |
| Comparative 1 | 70 | 30 | 0.3 | — | — | 0.66 | 1640 | 2370 | HB |
| Comparative 2 | 66 | 30 | 0.3 | 4 | — | 0.62 | 1580 | 2210 | HB |
| Comparative 3 | 66 | 30 | 0.3 | — | (Untreated) 4 | 0.53 | 1270 | 1830 | HB |
| Comparative 4 | 62 | 30 | 0.3 | 4 | (Untreated) 4 | 0.51 | 1230 | 1760 | V-0 |
| Comparative 5 | 53 | 30 | 0.3 | 4 | (Treated $Sb_2O_3$—A) 13 | 0.56 | 920 | 1390 | V-0 |
| 1 | 62 | 30 | 0.3 | 4 | (Treated $Sb_2O_3$—A) 4 | 0.61 | 1360 | 1900 | V-0 |
| 2 | 62 | 30 | 0.3 | 4 | (Treated $Sb_2O_3$—B) 4 | 0.59 | 1330 | 1930 | V-0 |
| 3 | 62 | 30 | 0.3 | 4 | (Treated $Sb_2O_3$—C) 4 | 0.58 | 1380 | 1940 | V-0 |
| 4 | 62 | 30 | 0.3 | 4 | (Treated $Sb_2O_3$—D) 4 | 0.59 | 1390 | 1940 | V-0 |
| 5 | 62 | 30 | 0.3 | 4 | (Treated $Sb_2O_3$—E) 4 | 0.63 | 1360 | 1990 | V-0 |

In the examples in which untreated antimony trioxide was added (Comparative Examples 3 and 4), the intrinsic viscosity and strength of the molded articles were greatly reduced compared with the examples in which antimony trioxide was not added (Comparative Examples 1 and 2), as is obvious from the results of Table 1.

On the other hand, in the examples in which antimony trioxide treated with alkoxysilane was added, the molded articles exhibited a high intrinsic viscosity and great strength. The strength of the molded articles, however, decreased when antimony trioxide treated with alkoxysilane was added in excess amounts (Comparative Example 5).

The molded articles did not assume the flame-retardant property V-0 when neither decabromodiphenyl ether nor antimony trioxide was added. When these two components were added, however, the molded articles exhibited an excellent flame-retardant property irrespective of whether antimony trioxide was treated or not.

EXAMPLE 6 AND COMPARATIVE EXAMPLE 6

Articles were molded using the compositions of Example 1 and Comparative Example 4 under the same conditions as in Example 1 or Comparative Example 4 except that the cylinder temperature of the molding machine was set to 280° C. and the properties of the molded articles were measured.

TABLE 2

| Example No. | Properties of Molded Articles | | | |
|---|---|---|---|---|
| | Intrinsic Viscosity | Tensile Strength (kg/cm$^2$) | Flexural Strength (kg/cm$^2$) | Flammability (UL-94) |
| 6 | 0.58 | 1310 | 1840 | V-0 |
| Comparative 6 | 0.42 | 870 | 1240 | V-II |

From the above results, it can be said that Example 6 is substantially the same as Example 1 though the properties of the molded articles were slightly deteriorated. On the other hand, a comparison of Comparative Example 6 and Comparative Example 4 shows a great decrease in intrinsic viscosity and static strength, indicating that the untreated antimony trioxide imparts a very poor heat resistivity to the polyethylene terephthalate as compared with antimony trioxide treated with alkoxysilane.

When the article of Comparative Example 6 was subjected to a burning test, the resin melted and dripped, causing the cotton to catch fire. Therefore, the flame-retarding property was V-II.

EXAMPLE 7 AND COMPARATIVE EXAMPLE 7

100 parts of a polybutylene terephthalate (intrinsic viscosity, 1.10) dried at 120° C. for 5 hours was admixed with 15 parts of decabromodiphenyl ether, 15 parts of antimony trioxide (B) treated with alkoxysilane (Reference Example B), and 56 parts of glass fiber. The mixture was melted, kneaded and extruded at a cylinder temperature of 250° C. to obtain pellets.

Using the pellets, test pieces were molded under a cylinder temperature of 240° C., a metal mold temperature of 70° C., and an injection pressure of 1,000 kg/cm$^2$ so as to measure the properties of the molded articles.

For the purpose of comparison, test pieces were prepared in the same manner as above except that untreated antimony trioxide instead of antimony trioxide treated with alkoxysilane was used to evaluate their properties.

The results are shown in Table 3 below.

TABLE 3

| Example No. | Properties of Molded Articles | | | |
|---|---|---|---|---|
| | Intrinsic Viscosity | Tensile Strength (kg/cm$^2$) | Flexural Strength (kg/cm$^2$) | Flammability (UL-94) |
| Comparative 7 | 0.93 | 1320 | 1870 | V-0 |
| 7 | 0.98 | 1450 | 2040 | V-0 |

It will be obvious from the results of Table 3 that in the system in which antimony trioxide treated with silane is added, the intrinsic viscosity decreases little and the molded products exhibit an increased strength as compared with those when untreated antimony trioxide is added.

EXAMPLE 8 AND COMPARATIVE EXAMPLE 8

Test pieces were formed, using the compositions of Example 7 and Comparative Example 7, under the same conditions as in Example 7 and Comparative Example 7 except that the cylinder temperature of the molding machine was changed to 270° C. to measure the properties of the molded products.

The results are shown in Table 4.

TABLE 4

| Example No. | Properties of Molded Articles | | |
|---|---|---|---|
| | Intrinsic Viscosity | Tensile Strength (kg/cm$^2$) | Flexural Strength (kg/cm$^2$) |
| Comparative 8 | 0.85 | 1050 | 1530 |
| 8 | 0.94 | 1370 | 1890 |

It will be understood from the above results that the molded article of Example 8 does not substantially differ from that of Example 7 though the properties are slightly decreased. On the other hand, a comparison of Comparative Example 8 and Comparative Example 7 indicates a great difference with regard to intrinsic viscosity and static strength. It will therefore be understood that the use of antimony trioxide treated with silane helps to greatly improve the thermal stability of the polybutylene terephthalate.

EXAMPLE 9

100 parts of a polybutylene terephthalate having an intrinsic viscosity of 0.85, 19 parts of a flame-retardant based on a polycarbonate (average polymerization degree, 17) obtained from tetrabromobisphenol A, phosgene and t-butylphenol, 8 parts of antimony trioxide (D) treated with alkoxysilane (Reference Example D) and 50 parts of glass fiber were blended uniformly in a tumbler. The mixture was kneaded, extruded, and then molded under the same conditions as in Example 7.

The properties of the obtained molded articles were as follows:

| Intrinsic Viscosity | 0.79 |
|---|---|
| Tensile Strength | 1310 kg/cm$^2$ |
| Flexural Strength | 1940 kg/cm$^2$ |
| Flammability | V-0 |
| Example 10 | |

100 parts of a polybutylene terephthalate having an intrinsic viscosity of 1.10, 10 parts of diglycidyl tetrabromoterephthalate as a flame-retardant and 7 parts of antimony trioxide (E) treated with alkoxysilane (Reference Example E) were uniformly blended. Then the mixture was kneaded, extruded, and molded under the same conditions as in Example 7.

The properties of the molded article were as follows:

| | |
|---|---|
| Intrinsic Viscosity | 1.05 |
| Tensile Strength | 690 kg/cm$^2$ |
| Flexural Strength | 1040 kg/cm$^2$ |
| Flammability | V-0 |

The above-mentioned diglycidyl tetrabromoterephthalate was synthesized as follows:

486 parts of tetrabromoterephthalic acid, 2800 parts of epichlorohydrin and 5 parts of triethylamine were heated at 90° C. for 4 hours. To the reaction mixture, 202 parts of 50% (by weight) aqueous sodium hydroxide solution was added dropwise over a 4 hour period at about 20° C. while being vigorously agitated and agitation was continued for an additional 30 minutes. Then the product was washed with water three times, the excessive epichlorohydrin was removed under a reduced pressure, and the residue was recrystallized from toluene.

Thus, 374 parts (63%) of diglycidyl tetrabromoterephthalate was obtained. The epoxy equivalent was 285 (purity 96%), and the melting point was 161° C.

EXAMPLES 11 TO 13

A thermoplastic polyester, decabromodiphenyl ether (Planelon ®DB-100, by Mitsui Toatsu Co.) as a flame-retardant, antimony trioxide (E) and a filler were blended in the proportions shown in Table 5. The mixture was kneaded and extruded to obtain pellets, and the pellets were subjected to molding under the same conditions as in Example 1.

The properties of the thus obtained molded articles are shown in Table 5.

It will be understood from the above results that compositions having a high thermal stability and static strength can be obtained when antimony trioxide treated with alkoxysilane is used as a flame-retardant, according to the present invention.

EXAMPLE 14 AND COMPARATIVE EXAMPLE 9

100 parts of polybutylene terephthalate (intrinsic viscosity, 1.10) dried at 120° C. for 5 hours was admixed with 0.7 part of montanic acid ester (trade name: Hoechst Wax ®E, saponification value 130-160, manufactured by Hoechst Co., West Germany) which works as a releasing agent, 18 parts of polycarbonate (average polymerization degree, 17) obtained from tetrabromobisphenol A, phosgene and t-butylphenol, which works as a flame-retardant, and 7 parts of antimony trioxide (prepared according to Reference Example A) treated with alkoxysilane. The mixture was then melted, kneaded and extruded using a monoaxial extruder having a diameter of 65 mm and a vent at a cylinder temperature of 250° C. to obtain pellets.

Using the pellets, test pieces were molded under a cylinder temperature of 240° C., a mold temperature of 70° C. and an injection pressure of 800 kg/cm$^2$ to measure the properties of the molded articles.

For the purpose of comparison, the test pieces were prepared in the same manner as above except that untreated antimony trioxide instead of antimony trioxide treated with alkoxysilane was used to evaluate their properties.

The results are shown in Table 6 below.

TABLE 6

| | Properties of Molded Articles | | | |
|---|---|---|---|---|
| Example No. | Intrinsic Viscosity | Tensile Strength | Tensile Elongation | Flammability |
| 14 | 0.98 | 640 kg/cm$^2$ | 26% | V-0 |
| Comparative 9 | 0.90 | 600 kg/cm$^2$ | 15% | V-0 |

It will be obvious from the results of Table 1 that in the system in which antimony trioxide treated with silane is added, the intrinsic viscosity decreases little and the molded products exhibit an increased strength as compared with those when untreated antimony trioxide is added.

EXAMPLE 15 AND COMPARATIVE EXAMPLE 10

Test pieces were formed using the compositions of Example 14 and Comparative Example 9 under the same conditions as in Example 14 and Comparative Example 9 except that the cylinder temperature of the molding machine was changed to 270° C. to measure the properties of the molded products.

The results are shown in Table 7.

TABLE 5

| | Composition (Parts) | | | | | |
|---|---|---|---|---|---|---|
| Example No. | Polyethylene Terephthalate (Intrinsic Viscosity 0.72) | Polybutylene Terephthalate (Intrinsic Viscosity 0.82) | Decabromoto-Diphenyl Ether | Antimony Trioxide (E) | Glass Fiber (3PE-231) | Talc (PKN, by Hayashi Chemical Co.) |
| 11 | 62 | — | 5 | 3 | 10 | 20 |
| 12 | 49 | — | 4 | 2 | 10 | 5 |
| 13 | 42 | 18 | 5 | 4 | 30 | — |

| | Composition (Parts) | | Properties of Molded Articles | | | |
|---|---|---|---|---|---|---|
| Example No. | Glass Flakes (Surfestrand, by Nippon Glassfiber Co.) | Triphenyl Phosphate (Stabilizer) | Intrinsic Viscosity | Tensile Strength (kg/cm$^2$) | Flexural Strength (kg/cm$^2$) | Flammability UL-94 |
| 11 | — | — | 0.62 | 1040 | 1470 | V-0 |
| 12 | 30 | — | 0.64 | 1200 | 1790 | V-0 |
| 13 | — | 1 | — | 1300 | 1860 | V-0 |

TABLE 7

| Example No. | Properties of Molded Articles | | | |
|---|---|---|---|---|
| | Intrinsic Viscosity | Tensile Strength | Tensile Elongation | Flammability |
| 15 | 0.94 | 620 kg/cm² | 23% | V-0 |
| Comparative 10 | 0.75 | 450 kg/cm² | 6% | V-0 |

It will be understood from the above results that the molded article of Example 15 does not substantially differ from that of Example 14 though the properties are slightly decreased. On the other hand, a comparison of Comparative Example 15 and Comparative Example 9 indicates a great difference with regard to intrinsic viscosity and static strength. It will therefore be understood that the use of antimony trioxide treated with silane helps to greatly improve the thermal stability of the polybutylene terephthalate.

EXAMPLES 16 TO 20 AND COMPARATIVE EXAMPLES 11 TO 15

A polyethylene terephthalate having an intrinsic viscosity of 0.71 and dried at 140° C. for 5 hours was admixed with a glass chopped strand (trade name: 3PE 231, manufactured by Nitto Boseki Co.) having a length of 3 mm, talc as a nucleating agent, decabromodiphenyl ether (Planelon ®DB-100, by Mitsui Toatsu Co.) as a flame-retardant, a terminal-blocked polycaprolactone as a plasticizer, triphenyl phosphate as a stabilizing agent, and the above-mentioned antimony trioxides in the proportions shown in Table 8, and the mixture was homogeneously mixed using a V-type blender. The obtained mixture was melted and mixed in a monoaxial extruder having a diameter of 65 mm and a vent at a barrel temperature of 270° C., and the threads extruded from the die were cooled and cut to obtain pellets for forming molded articles.

The pellets were then dried in hot air heated at 140° C. for 5 hours and were introduced into a 5-ounce injection-molding machined equipped with a test piece mold for measuring physical properties, under the molding conditions of a cylinder temperature of 260° C., a mold temperature of 70° C., an injection pressure of 800 kg/cm², a cooling time of 20 seconds, and a total cycle of 35 seconds.

The properties of the thus obtained molded articles are shown in Table 8.

Here, the terminal-blocked polycaprolactone was obtained in the following way. Namely, 100 parts of a commercially available polycaprolactone in which terminal groups hydroxyl groups (trade name: PLACCEL ® #212, number average molecular weight, 1200; manufactured by Daicel Co.) was admixed with 80 parts of methyl benzoate and 0.002 part of tributyl titanate. The mixture was heated at from 190° to 210° C. to effect a reaction for 10 hours while being stirred, permitting methanol formed during the reaction to be distilled off. Thereafter, the excess amount of methyl benzoate was removed under reduced pressure. The thus obtained terminal-blocked polycaprolactone exhibited a hydroxyl value of 1.7 as measured in accordance with JIS-K-1557.

TABLE 8

| Example No. | Composition (Parts) | | | | | | |
|---|---|---|---|---|---|---|---|
| | Polyethylene Terephthalate | Glass Fiber | Terminal-blocked Polycaprolactone | Triphenyl Phosphate | Talc | Decabromodiphenyl Ether | Antimony Trioxide |
| Comparative 11 | 59.5 | 30 | 5 | 0.5 | 5 | — | — |
| Comparative 12 | 55.5 | 30 | 5 | 0.5 | 5 | 4 | — |
| Comparative 13 | 55.5 | 30 | 5 | 0.5 | 5 | — | (Untreated) 4 |
| Comparative 14 | 51.5 | 30 | 5 | 0.5 | 5 | 4 | (Untreated) 4 |
| Comparative 15 | 42.5 | 30 | 5 | 0.5 | 5 | 4 | ($Sb_2O_3$-A) 13 |
| 16 | 51.5 | 30 | 5 | 0.5 | 5 | 4 | ($Sb_2O_3$-A) 4 |
| 17 | 49.5 | 30 | 7 | 0.5 | 5 | 6 | ($Sb_2O_3$-B) 2 |
| 18 | 51.5 | 30 | 5 | 0.5 | 5 | 5 | ($Sb_2O_3$-C) 3 |
| 19 | 48.5 | 30 | 5 | 0.5 | 5 | 7 | ($Sb_2O_3$-D) 5 |
| 20 | 50.5 | 30 | 5 | 0.5 | 5 | 5 | ($Sb_2O_3$-E) 4 |

| Example No. | Properties of Molded Articles | | | | |
|---|---|---|---|---|---|
| | Tensile Strength (kg/cm²) | Tensile Elongation (%) | Impact Strength (without notch) (kg.cm/cm) | Flammability | Intrinsic Viscosity |
| Comparative 11 | 1350 | 2.1 | 54 | HB | — |
| Comparative 12 | 1300 | 2.0 | 51 | HB | — |
| Comparative 13 | 1050 | 1.5 | 39 | HB | — |
| Comparative 14 | 1010 | 1.4 | 38 | V-0 | 0.49 |
| Comparative 15 | 760 | 1.1 | 26 | V-0 | — |
| 16 | 1240 | 1.9 | 49 | V-0 | 0.61 |
| 17 | 1180 | 2.3 | 58 | V-0 | — |
| 18 | 1270 | 1.9 | 50 | V-0 | — |
| 19 | 1110 | 1.6 | 42 | V-0 | — |
| 20 | 1140 | 1.8 | 45 | V-0 | — |

In the examples in which untreated antimony trioxide was added (Comparative Examples 13 and 14), the strength of the molded articles was greatly reduced as compared with the examples in which antimony trioxide was not added (Comparative Examples 11 and 12), as is obvious from the results of Table 8. On the other hand, in the examples in which antimony trioxide treated with silane was added, the molded articles exhibited a great strength. The strength of the molded articles, however, decreased when antimony trioxide treated with silane was added in excess amounts (Comparative Example 15).

The molded articles did not assume the flame-retarding property V-O when neither decabromodiphenyl ether nor antimony trioxide was added. When the two components were added, however, the molded articles exhibited an excellent flame-retarding property irrespective of whether antimony trioxide was treated or not.

EXAMPLE 21 AND COMPARATIVE EXAMPLE 16

Articles were molded using the compositions of Example 16 and Comparative Example 14 under the same conditions as in Example 16 or Comparative Example 12 except that the cylinder temperature of the molding machine was set to 280° C. to measure the properties of the molded articles.

TABLE 9

| | | Properties of Molded Articles | | | |
|---|---|---|---|---|---|
| Example No. | Intrinsic Viscosity | Tensile Strength (kg/cm²) | Tensile Elongation (%) | Impact Strength (without notch) (kg cm/cm) | Flammability |
| 21 | 0.57 | 1190 | 1.9 | 46 | V-0 |
| Comparative 16 | 0.40 | 710 | 0.9 | 23 | V-II |

From the above results, it can be said that Example 21 is substantially the same as Example 16, though the properties of the molded article were slightly decreased. On the other hand, a comparison of Comparative Example 16 and Comparative Example 14 shows a great decrease in the intrinsic viscosity and static strength, indicating that the untreated antimony trioxide imparts a very poor heat resistivity to the polyethylene terephthalate as compared with antimony trioxide treated with alkoxysilane.

When the article of Comparative Example 16 was subjected to a burning test, the resin melted and dripped, causing the cotton to catch fire. Therefore, the flame-retardant property was V-II.

EXAMPLES 22 AND 23 AND COMPARATIVE EXAMPLES 17 AND 18

A thermoplastic polyester, a brominated polystyrene (trade name: PYRO-CHEK ® 68PB, containing 68% of bromine, manufactured by Nissan Ferro Co.) as a flame-retardant, antimony trioxide treated with alkoxysilane (according to Reference Example A) or untreated antimony trioxide, the terminal-blocked polycaprolactone used in Example 16, and a variety of fillers and additives, were mixed together in the proportions shown in Table 10. The mixture was kneaded and extruded under the same conditions as in Example 16 to obtain pellets, and Molded articles were formed from the pellets.

The properties of the thus obtained molded articles are shown in Table 10.

TABLE 10

| | | Example No. | | | |
|---|---|---|---|---|---|
| | | 22 | 23 | Comparative 17 | Comparative 18 |
| Composition (Parts) | Polyethylene Terephthalate (Intrinsic Viscosity 0.72) | 42 | 23 | 42 | 23 |
| | Polybutylene Terephthalate (Intrinsic Viscosity 0.83) | — | 23 | — | 23 |
| | Brominated Polystylene | 10 | 8 | 10 | 8 |
| | Antimony Trioxide | (Treated) 2 | (Treated) 1.5 | (Untreated) 2 | (Untreated) 1.5 |
| | Glass Fiber (3PE-231) | 30 | 10 | 30 | 10 |
| | Talc (PKN, Hayashi Chemical Co.) | 3 | 5 | 3 | 5 |
| | Glass Flakes (Nippon Glassfiber Co.) | — | 20 | — | 20 |
| | Triphenyl Phosphate (Stabilizer) | 1 | 1 | 1 | 1 |
| | Ionomer (HI-MILAN ® 1707, Mitsui Polychemical Co.) | 4 | 2 | 4 | 2 |
| | Epoxy Compound | 1* | 1.5** | 1* | 1.5** |
| | Terminal-blocked Polycaprolactone | 7 | 5 | 7 | 5 |
| Properties of Molded Articles | Tensile Strength (kg/cm²) | 1340 | 1260 | 1060 | 970 |
| | Tensile Elongation (%) | 2.2 | 1.9 | 1.6 | 1.4 |
| | Impact Strength (without notch) (kg.cm/cm) | 71 | 55 | 43 | 36 |
| | Combustibility | V-0 | V-0 | V-0 | V-0 |

*Epikote ® #1009, Shell Chemical Co.
**Denacol ® #840, Nagase Industrial Co.

It will be understood from the above results that compositions having a high static strength can be obtained when antimony trioxide treated with alkoxysilane is used as a flame-retardant.

EXAMPLES 24 AND 25 AND COMPARATIVE EXAMPLES 19 AND 20

46 parts of a polyethylene terephthalate having an intrinsic viscosity of 0.71 and dried at 130° C. for 10 hours, 10 parts of a polycarbonate (Panlite ® L-1250, by Teijin Chemicals Co.; average molecular weight, 25,000) dried at 120° C. for 5 hours, 30 parts of glass chopped strands 3 mm in length, 10 parts of a brominated polystyrene (PYRO-CHEK ® 68 PB, by Nissan Ferro Co.; bromine content, 68 wt.%), 2 parts of talc (PKN, by Hayashi Chemical Co.) and 2 parts of treated antimony trioxide (A) or untreated antimony trioxide were uniformly blended in a V-type blender. The mixture was melted and kneaded in a monoaxial extruder having a diameter of 65 mm and a vent at a barrel temperature of 270° C., and the threads extruded from the die were cooled and cut to obtain pellets for forming molded articles.

The pellets were then dried in hot air at 130° C. for 5 hours, and test pieces were formed on a 5-ounce injection-molding machine equipped with a test piece mold for measuring physical properties, under the molding conditions of a mold temperature of 140° C., a cylinder temperature as shown in Table 11, an injection pressure of 800 kg/cm², a cooling time of 20 seconds and a total cycle of 35 seconds.

The measured properties are shown in Table 11 below.

for 5 hours, 12.9 parts of a polycarbonate (Panlite ® L-1250, by Teijin Chemicals Co.) dried under the same conditions as the polybutylene terephthalate, 0.9 parts of triphenyl phosphate, 8.6 parts of a brominated polycarbonate, 1.7 parts of a brominated epoxy compound and 5.2 parts of treated antimony trioxide (B) or untreated antimony trioxide were uniformly blended. The mixture was melted, kneaded, and extruded in a monoaxial extruder having a diameter of 65 mm and a next at a barrel temperature of 250° C. to obtain pellets.

The pellets were then formed into test pieces for measuring physical properties at a cylinder temperature of 270° C., a mold temperature of 60° C., and an injection pressure of 800 kg/cm².

The measured properties are shown in Table 12.

The brominated polycarbonate employed in the above procedure was one obtained from tetrabromobisphenol A and phosgene (FG-7100, by Teijin Chemicals Co.; average polymerization degree, 17; bromine content, 52 wt.%), and the brominated epoxy compound was one obtained by a condensation reaction between tetrabromobisphenol A and epichlorohydrin (HR-128F, by Hitachi Chemical Co.; epoxy equivalent, 1,800; bromine content, 50 wt.%).

TABLE 11

| Example No. | Cylinder Temperature (°C.) | Antimony Trioxide | Properties of Molded Articles | | | |
|---|---|---|---|---|---|---|
| | | | Appearance | Tensile Strength (kg/cm²) | Impact Strength (kg.cm/cm) | Flammability |
| 24 | 270 | Treated | Good | 1380 | 54 | V-0 |
| Comparative 19 | 270 | Untreated | Silver streaked | 1220 | 43 | V-0 |
| 25 | 300 | Treated | Good | 1310 | 49 | V-0 |
| Comparative 20 | 300 | Untreated | Fine foam on surface | 870 | 28 | V-II |

As will be clearly understood, in the system in which antimony trioxide treated with alkoxysilane was employed (Examples 24 and 25), resin compositions having an excellent thermal stability were obtained and the resultant molded articles had a good appearance and a high static strength. On the other hand, in the system in which untreated antimony trioxide was employed (Comparative Examples 19 and 20), the resultant molded articles had an inferior appearance and strength. In particular, in the case of a cylinder temperature of 300° C., the strength of the molded article was greatly reduced, fine foam appeared on the surface of the molded article, and, in addition, dripping of the melted material occured to a large extent at the time of molding.

When the article of Comparative Example 20 was subjected to a burning test, the melted resin dripped, causing the cotton to catch fire. Thus, the flammability was evaluated as V-II.

EXAMPLE 26 AND COMPARATIVE EXAMPLE 21

A total of 70.7 parts of a polybutylene terephthalate having an intrinsic viscosity of 1.01 and dried at 120° C.

TABLE 12

| Example No. | Antimony Trioxide | Properties of Molded Articles | | | |
|---|---|---|---|---|---|
| | | Appearance | Tensile Strength (kg/cm²) | Tensile Elongation (%) | Combustibility |
| 26 | Treated | Good | 680 | 19.8 | V-0 |
| Comparative 21 | Untreated | Fine foam on surface | 520 | 6.6 | V-0 |

It is apparent from the above Table that the molded article obtained by employing antimony trioxide treated with alkoxysilane has a superior appearance and strength to that obtained by employing untreated antimony trioxide.

EXAMPLES 27 AND 28 AND COMPARATIVE EXAMPLES 22 TO 26

A polycarbonate (Panlite ® L-1250, by Teijin Chemicals Co.) dried at 120° C. for 5 hours, decabromodiphenyl ether (Planelon ® DB-100, by Mitsui Toatsu Co.) as a flame-retardant, and antimony trioxide were uniformly blended in a V-type blender in the proportions shown in Table 13. The mixture was formed into pellets for molding by melting and kneading it in an extruder having a diameter of 65 mm at a barrel temperature of 280° C. and then cooling and cutting the threads extruded from the die.

The pellets were then dried in hot air at 120° C. for 5 hours and were formed into test pieces for measuring physical properties using a 5-ounce injection molding machine equipped with a test piece mold, under the molding conditions of a cylinder temperature of 280° C., a mold temperature of 100° C., an injection pressure of 1,000 kg/cm², a cooling time of 20 seconds and a total cycle of 35 seconds.

The measured properties of the molded articles are shown in Table 13.

TABLE 13

| Example No. | Composition (Parts) | | | Properties of Molded Articles | | | |
|---|---|---|---|---|---|---|---|
| | Polycarbonate | Decabromo-diphenyl Ether | Antimony Trioxide | Appearance | Specific Gravity | Tensile Strength (kg/cm²) | Flammability |
| Comparative 22 | 100 | — | — | o | 1.20 | 650 | V-2 |
| Comparative 23 | 95 | 5 | — | o | 1.24 | — | V-2 |
| Comparative 24 | 95 | — | 5 (Untreated) | x (Foam on surface) | 1.15 | — | V-2 |
| Comparative 25 | 90 | 5 | 5 (Untreated) | x (Foam on surface) | 1.16 | 450 | V-0 |
| 27 | 90 | 5 | 5 (Treated Sb₂O₃—A) | o | 1.29 | 660 | V-0 |
| 28 | 90 | 5 | 5 (Treated Sb₂O₃—C) | o | 1.29 | 660 | V-0 |
| Comparative 26 | 79 | 5 | 16 (Treated Sb₂O₃—C) | Δ (Some foam on surface) | 1.40 | — | V-0 |

As will be clearly understood from Table 13, in the examples in which untreated antimony trioxide was added (Comparative Examples 24 and 25), the appearance, specific gravity and tensile strength of the molded articles were inferior to those of the examples in which antimony trioxide was not added (Comparative Examples 22 and 23). On the other hand, in the examples in which antimony trioxide treated with alkoxysilane was added, the molded articles had an excellent appearance and high strength. However, the molded article of the example in which antimony trioxide treated with alkoxysilane was added in an excess amount (Comparative Example 26) had an nferior appearance and low specific gravity.

EXAMPLE 29

100 parts of a polycarbonate containing 30% by weight of reinforcing glass fiber, 10 parts of a polycarbonate (average polymerization degree, 4) obtained from tetrabromobisphenol A as a flame-retardant, and 4 parts of treated antimony trioxide (D) were uniformly blended, and the mixture was kneaded, extruded, and then molded, as in Example 27.

No foam was observed on the molded article.

What is claimed is:

1. A flame-retardant resin composition comprising (A) a polymer resin comprised of a thermoplastic polyester and 0 to 100 parts by weight of a thermoplastic polycarbonate per 100 parts by weight of the thermoplastic polyester; and per 100 parts by weight of the polymer resin, (B) 0.1 to 30 parts by weight, as the weight of the halogen element, of an organic halogen compound, (C) 0.1 to 20 parts by weight, as the weight of the antimony element, of antimony trioxide surface modified with an alkoxysilane compound of the general formula, $$R^1-Si(OR^2)_3 \text{ or } Si(OR^2)_4$$

wherein $R^1$ is a methyl or phenyl group, and $R^2$ is an aliphatic hydrocarbon group with 1 to 15 carbon atoms, and (D) up to 30 parts by weight of a carboxylic acid ester composition.

2. A composition as claimed in claim 1, wherein the amount of the carboxylic acid ester compound is 1 to 15 parts by weight.

3. A composition as claimed in claim 1 or 2, wherein the carboxylic acid ester compound is selected from the terminal-blocked polycaprolactones represented by the general formula, $$[R^{12}CO+O+CH_2)_5CO]_nO]_mR^{11}[CO+O+CH_2)_5CO]_{n'}OR^{13}]_{m'}$$

wherein $R^{11}$ denotes an organic group having the value $(m+m')$, $R^{12}$ and $R^{13}$ each denotes a monovalent organic group, n and n' are each a number greater than 2, and m and m' are each a number of from 0 to 4, $(m+m')$ being greater than 1 and having a number average molecular weight of not more than 20,000.

4. A composition as claimed in claim 1, wherein the organic halogen compound is contained in an amount of 1 to 15 parts by weight, as the weight of the halogen element, per 100 parts by weight of the polymer resin.

5. A composition as claimed in claim 1, wherein the halogen of the organic halogen compound is bromine.

6. A composition as claimed in claim 1, wherein the antimony trioxide treated with an alkoxysilane compound is contained in an amount of 1 to 15 parts by weight, as the weight of the antimony element, per 100 parts by weight of the polymer resin.

7. A composition as claimed in claim 1, wherein the alkoxysilane compound is methyltrimethoxysilane.

8. A composition as claimed in claim 1, wherein the alkoxysilane compound is methyltriethoxysilane.

9. A composition as claimed in claim 1, wherein the thermoplastic polyester is selected from polyethylene terephthalate and polybutylene terephthalate.

10. A composition as claimed in claim 1, further comprising up to 200 parts by weight of a filler per 100 parts by weight of the polymer resin.

* * * * *